(12) United States Patent
Zheng

(10) Patent No.: US 11,933,343 B2
(45) Date of Patent: Mar. 19, 2024

(54) WASHER AND FASTENING STRUCTURE

(71) Applicant: TOSHIBA MITSUBISHI-ELECTRIC INDUSTRIAL SYSTEMS CORPORATION, Chuo-ku (JP)

(72) Inventor: Jun Zheng, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 289 days.

(21) Appl. No.: 17/614,915

(22) PCT Filed: Sep. 27, 2019

(86) PCT No.: PCT/JP2019/038086
§ 371 (c)(1),
(2) Date: Nov. 29, 2021

(87) PCT Pub. No.: WO2021/059466
PCT Pub. Date: Apr. 1, 2021

(65) Prior Publication Data
US 2022/0235813 A1 Jul. 28, 2022

(51) Int. Cl.
*F16B 5/02* (2006.01)
*F16B 43/00* (2006.01)

(52) U.S. Cl.
CPC ............ *F16B 43/001* (2013.01); *F16B 5/02* (2013.01)

(58) Field of Classification Search
CPC ...... F16B 33/004; F16B 2200/93; F16B 5/02; F16B 43/001
(Continued)

(56) References Cited

U.S. PATENT DOCUMENTS 2,761,347 A * 9/1956 McKee, Jr. ........... F16B 43/001
411/371.1
3,153,971 A * 10/1964 Lovisek ................ F16B 43/001
411/371.1
(Continued)

FOREIGN PATENT DOCUMENTS

CN 109312772 A 2/2019
DE 1 924 896 A1 11/1969
(Continued)

OTHER PUBLICATIONS

Combined Chinese Office Action and Search Report dated Apr. 2, 2022, in corresponding Chinese Patent Application No. 201980005025.1 (with English Translation), 15 pages.
(Continued)

*Primary Examiner* — Victor D Batson
*Assistant Examiner* — Dil K. Magar
(74) *Attorney, Agent, or Firm* — Oblon, McClelland, Maier & Neustadt, L.L.P.

(57) ABSTRACT

A washer includes a conductive main body, a first seal portion, and a second seal portion. The main body includes an annular plate-shaped body and a protruding portion. The protruding portion protrudes in the thickness direction from the outer peripheral portion of the plate-shaped body. The first seal portion covers the inner peripheral surface at the inner peripheral portion and both surfaces in the thickness direction of the plate-shaped body. The second seal portion covers at least the distal end portion of the protruding portion.

4 Claims, 3 Drawing Sheets

(58) Field of Classification Search
USPC .............. 411/371.1, 542, 531, 162, 160, 371
See application file for complete search history.

(56) References Cited

U.S. PATENT DOCUMENTS

| | | | | |
|---|---|---|---|---|
| 3,184,769 A * | 5/1965 | Barwood | .............. | F16B 43/001 470/42 |
| 3,202,033 A * | 8/1965 | Weidner, Jr. | .......... | F16B 43/001 411/371.1 |
| 3,286,577 A * | 11/1966 | Weidner, Jr. | ............. | F16J 15/12 411/542 |
| 3,376,714 A * | 4/1968 | Manoni | ................... | F16D 7/025 411/536 |
| 3,588,787 A | 6/1971 | Kindell | | |
| 3,622,167 A * | 11/1971 | Velthoven | ............. | F16B 43/001 277/630 |
| 3,661,046 A * | 5/1972 | Waud | .................. | F16B 25/0047 277/637 |
| 3,711,347 A * | 1/1973 | Wagner | ................. | F16B 33/004 84/41 |
| 3,742,808 A * | 7/1973 | Trembley | .............. | F16B 43/001 411/432 |
| 3,783,734 A * | 1/1974 | Velthoven | ............. | F16B 43/001 411/8 |
| 3,910,588 A * | 10/1975 | Austin | .................. | E04D 3/3606 411/959 |
| 4,026,183 A * | 5/1977 | Bart | ...................... | F16B 43/001 411/542 |
| 4,191,389 A * | 3/1980 | Jelinek | .................. | F16B 43/001 277/637 |
| 4,701,088 A * | 10/1987 | Crull | ....................... | F16B 33/00 411/533 |
| 4,757,661 A * | 7/1988 | Hasan | .................. | E04D 3/3603 411/533 |
| 4,975,008 A * | 12/1990 | Wagner | ................. | F16B 43/001 411/533 |
| 5,193,960 A * | 3/1993 | Fukushima | ........... | F16B 43/001 411/902 |
| 5,865,583 A * | 2/1999 | Krawczak | ............. | F16B 33/004 411/533 |
| 9,441,664 B2 * | 9/2016 | Utsuno | ................. | F16B 43/001 |
| 2006/0233627 A1 * | 10/2006 | Weinstein | ............ | F16J 15/3276 411/369 |
| 2010/0047033 A1 * | 2/2010 | Baumgartner | ........ | F16B 35/048 411/84 |
| 2011/0211933 A1 * | 9/2011 | Giraud | .................... | F16B 21/02 411/371.2 |
| 2012/0148369 A1 * | 6/2012 | Michalski | ............ | F16B 43/001 411/371.1 |
| 2015/0247524 A1 * | 9/2015 | Utsuno | ................. | F16B 43/001 411/542 |
| 2016/0036285 A1 * | 2/2016 | Klopp | ................... | F16B 43/001 29/525.01 |
| 2016/0273572 A1 * | 9/2016 | Dobbin | .................. | B64D 45/02 |
| 2017/0268547 A1 * | 9/2017 | Mori | ....................... | F16B 43/00 |
| 2020/0102090 A1 * | 4/2020 | Morden | ................ | F16B 33/004 |

FOREIGN PATENT DOCUMENTS

| | | | | |
|---|---|---|---|---|
| JP | 3021202 U | | 11/1995 | |
| JP | 2000249132 A | * | 9/2000 | |
| JP | 2013-2621 A | | 1/2013 | |
| JP | 2013002621 A | * | 1/2013 | |
| JP | 2017-172789 A | | 9/2017 | |
| JP | 2017172789 A | * | 9/2017 | ............. B62D 27/02 |
| WO | WO-2014061122 A1 | * | 4/2014 | ............ F16B 41/002 |
| WO | WO-2014080511 A1 | * | 5/2014 | ............ F16B 43/001 |

OTHER PUBLICATIONS

Office Action dated May 10, 2022, in corresponding Indian Patent Application No. 202017029990 (with English Translation), 8 pages.
International Search Report dated Nov. 19, 2019 in PCT/JP2019/038086 filed Sep. 27, 2019, 2 pages.

* cited by examiner

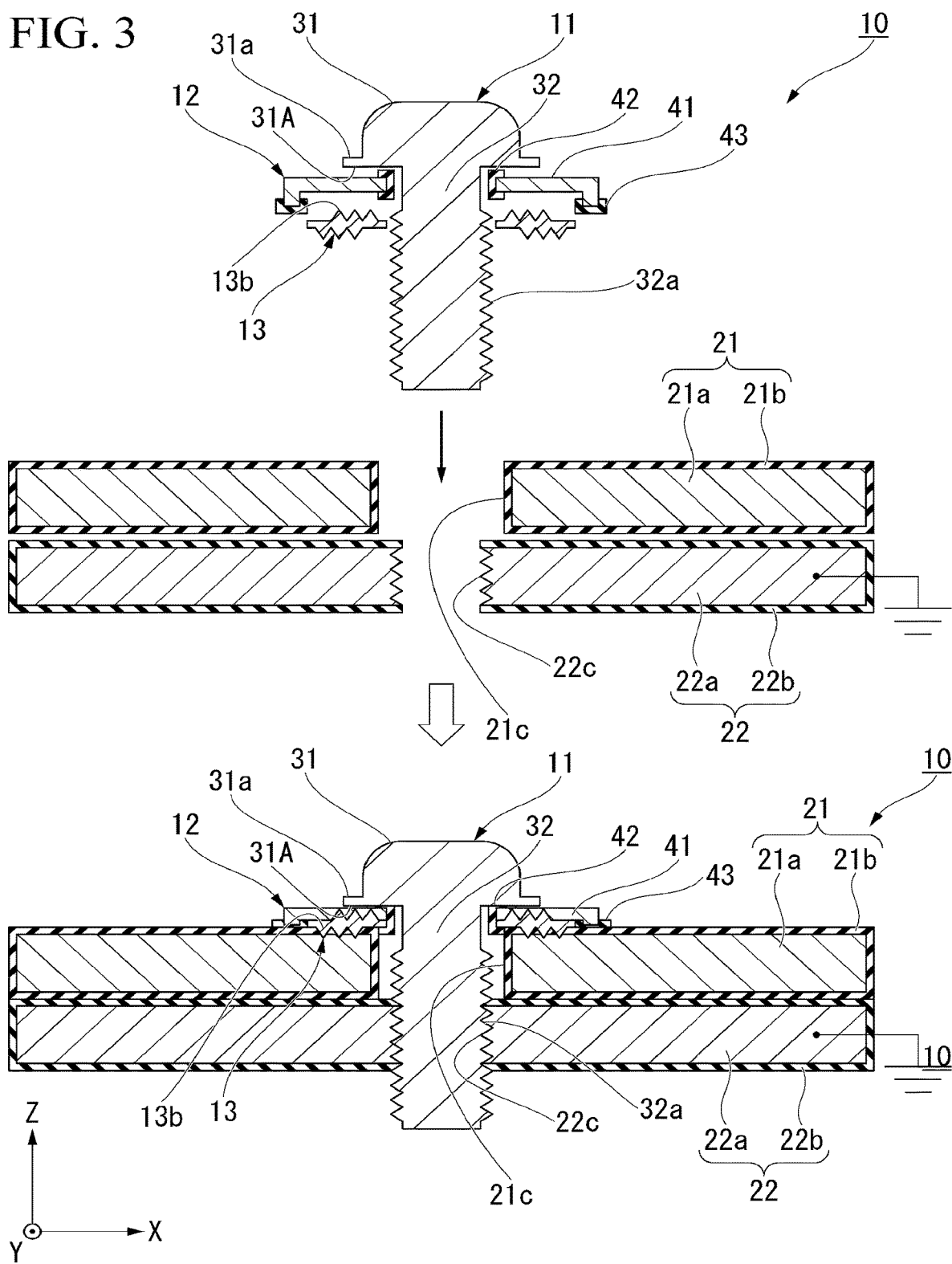

WASHER AND FASTENING STRUCTURE

TECHNICAL FIELD

The present invention relates to a washer and a fastening structure.

BACKGROUND ART

Conventionally, a seal washer has been known that, when two fixing members are fixed by bolts, secures a sealing property between the fixing member and the bolt. There is a seal washer that has, for example, a washer body formed of a metal in a ring shape, and a seal portion formed of an elastic material on the surface of the washer body. The seal washer seals the space between the head of the bolt or the washer that is in contact with the head of the bolt and the fixing member with a seal portion.

However, for example, when a plurality of members having an insulating film are fastened and fixed, it may be difficult to conduct the plurality of members to the same potential while securing the sealing property.

PRIOR ART DOCUMENTS

Patent Document

[Patent Document 1]
Japanese Unexamined Patent Application, First Publication No. 2013-2621

SUMMARY OF INVENTION

Problems to be Solved by the Invention

The problem to be solved by the present invention is to provide a washer and a fastening structure that can fix a plurality of fixing members in a conductive state while securing sealing properties.

Means for Solving the Problems

The washer of the embodiment includes a conductive main body, a first seal portion, and a second seal portion. The main body has an annular plate-shaped body and a protruding portion. The protruding portion protrudes in the thickness direction from the outer peripheral portion of the plate-shaped body. The first seal portion covers the inner peripheral surface at the inner peripheral portion and both surfaces in the thickness direction of the plate-shaped body. The second seal portion covers at least the distal end portion of the protruding portion.

BRIEF DESCRIPTION OF DRAWINGS

FIG. 3 is a sectional view showing before and after fastening of fastening structure of the embodiment

DESCRIPTION OF EMBODIMENTS

Hereinafter, a washer and a fastening structure of the embodiment will be described with reference to the drawings.

Figure 1:
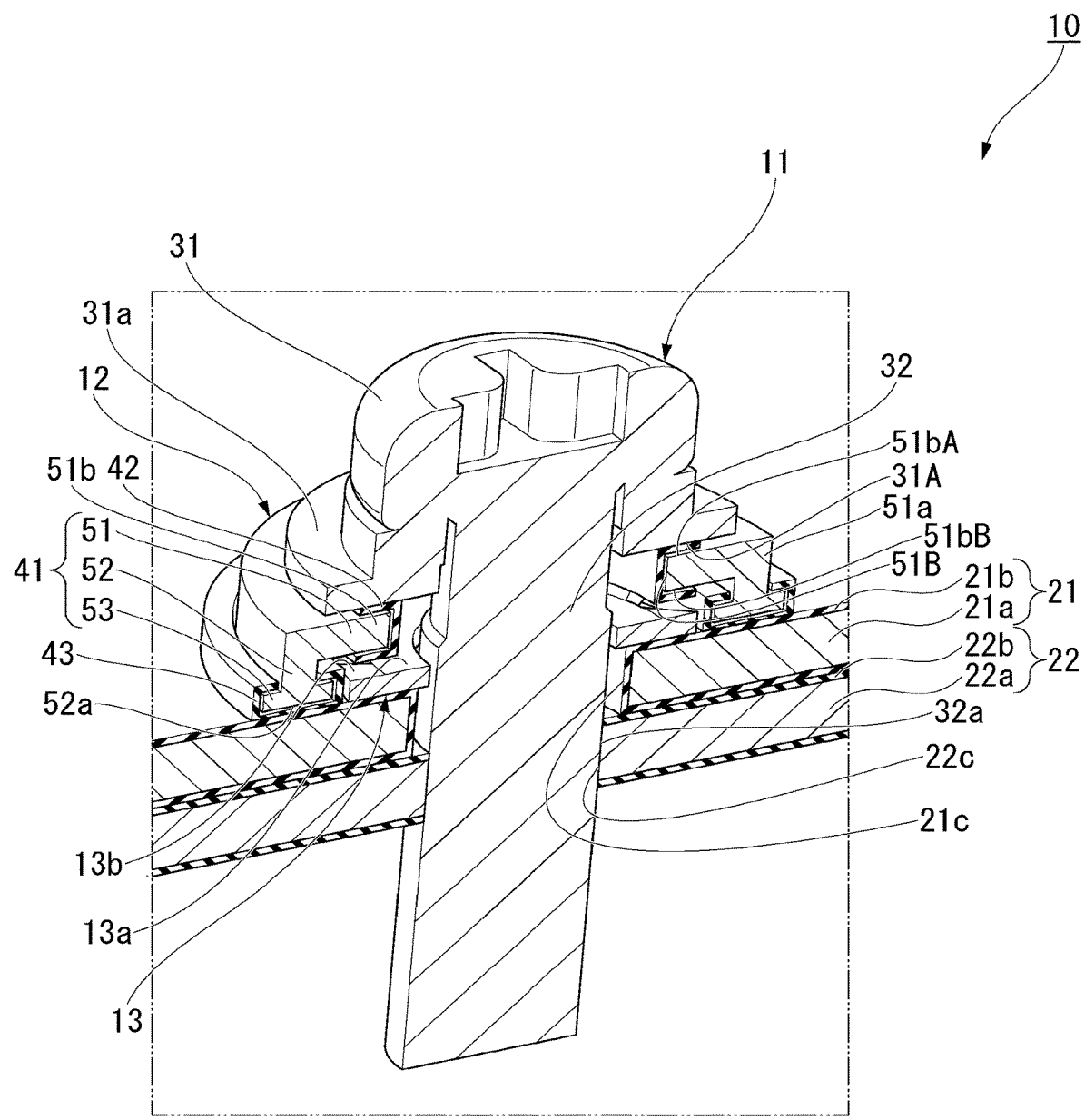
FIG. 1 is a perspective view of a fastening structure according to an embodiment.
Figure 1:
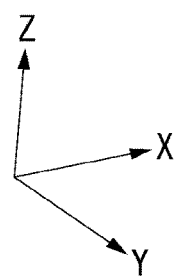
Figure 2:
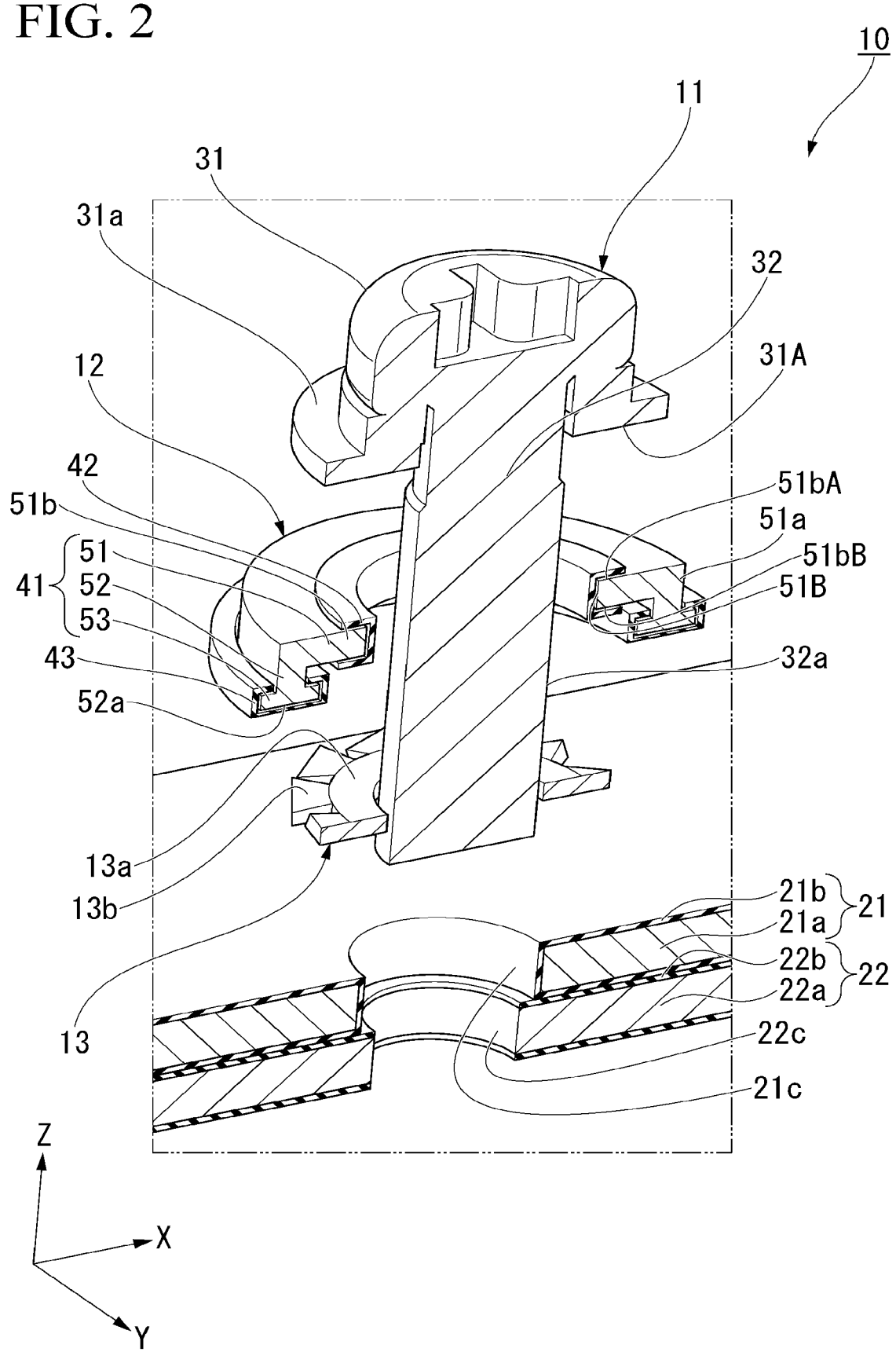
FIG. 2 is an exploded perspective view of the fastening structure according to the embodiment.

FIG. 1 is a perspective view of a fastening structure 10 according to the embodiment. FIG. 2 is an exploded perspective view of the fastening structure 10 according to the embodiment. FIG. 3 is a sectional view showing before and after fastening of fastening structure 10 of the embodiment.

Hereinafter, the X-axis, Y-axis, and Z-axis directions orthogonal to each other in the three-dimensional space are directions parallel to the respective axes. For example, the left-right direction of the fastening structure 10 is parallel to the X-axis direction. The front-back direction of the fastening structure 10 is parallel to the Y-axis direction. The axial direction of the fastening structure 10 is parallel to the Z-axis direction.

The fastening structure 10 according to the embodiment is provided, for example, on the housing of various panels provided in electrical equipment or the like. The panels are a power distribution panel, a power distribution panel, a control panel, and the like that constitute a power conversion device, a power supply device, a motor drive device, and the like. The housing houses various electric devices inside. Various electric devices include a transformer, a switch, a circuit breaker, a measuring device, a control device, and the like.

As shown in FIGS. 1, 2, and 3, the fastening structure 10 according to the embodiment includes a screw 11, a first washer (an example of a washer in claim 1) 12, and a second washer (an example of an annular member in the claims) 13 to be used by being superimposed on the first washer 12. The fastening structure 10 fixes, for example, a first fixing member 21 and a second fixing member 22 that are stacked and arranged in the thickness direction. The thickness direction of the first fixing member 21 and the second fixing member 22 is parallel to the axial direction.

The first fixing member 21 and the second fixing member 22 include conductive main bodies 21a, 22a and electrically insulating coatings (coating layers) 21b, 22b. Each coating 21b, 22b covers the surface of each main body 21a, 22a. The first fixing member 21 and the second fixing member 22 are electrically insulated by being in contact with each other via the coatings 21b and 22b in a state where the fastening structure 10 is in a non-fastened state.

The screw 11 is formed of a conductive material. The screw 11 has a head 31 and a shaft 32 protruding from the head 31.

The head 31 includes a flange portion 31a provided at an end on the side of the shaft portion 32 in the axial direction. The outer shape of the flange portion 31a is, for example, an annular plate protruding radially outward from the surface of the head portion 31. The radial direction is parallel to a direction orthogonal to the axial direction. The surface of the flange portion 31a on the shaft portion 32 side in the axial direction is a seat surface 31A that contacts the first washer 12 in a state where the fastening structure 10 is in a fastening state. The outer diameter of the seat surface 31A is larger than the outer diameter of the end of the head 31.

The shaft portion 32 is connected to an end surface of the head portion 31 on the flange portion 31a side. The outer diameter of the shaft 32 is smaller than the outer diameter of the end of the head 31. The shaft portion 32 includes a screw portion 32a provided with a screw thread from the base portion on the head 31 side to the distal end portion in the axial direction.

The shaft portion 32 is inserted into the first washer 12, the second washer 13, and the through hole 21c of the first fixing member 21. The shaft portion 32 is fastened and fixed to the second fixing member 22 by, for example, fitting the screw portion 32a to a female screw 22c of the second fixing member 22. For example, the wall surface forming the through hole 21*c* of the first fixing member 21 is covered with an electrically insulating film 21*b*. The female screw 22*c* of the second fixing member 22 is formed by a conductive main body 22*a*, and the surface of the female screw 22*c* is exposed from the electrically insulating film 22*b*.

The outer shape of the first washer 12 is, for example, a cylindrical shape having a bottom with a through hole formed therein. The first washer 12 is disposed with its bottom facing the opposite side of each of the fixing members 21 and 22. The first washer 12 includes a conductive main body 41, and a first seal portion 42 and a second seal portion 43 that are electrically insulating and cover a part of the main body 41.

The outer shape of the main body 41 is, for example, an annular shape having an L-shaped cross section in the circumferential direction. The main body 41 includes a plate-shaped body 51, a protruding portion 52, and a radial protruding portion 53.

The outer shape of the plate-shaped body 51 is, for example, an annular plate whose axial direction is the Z direction. The inner diameter of the plate-shaped body 51 is larger than the outer diameter of the shaft portion 32 and smaller than the outer diameter of the seat surface 31A of the flange portion 31*a*. The outer diameter of the plate-shaped body 51 is larger than the outer diameter of the seat surface 31A of the flange portion 31*a*. Part of the plate-shaped body 51 is sandwiched between the seat surface 31A of the screw 11 and the second washer 13 from both sides in the axial direction in a state where the fastening structure 10 is in a fastening state.

The outer shape of the protruding portion 52 is, for example, a cylindrical shape whose axial direction is the Z direction. The protruding portion 52 protrudes in the thickness direction from the outer peripheral portion 51*a* of the plate-shaped body 51. The thickness direction of the plate-shaped body 51 is parallel to the axial direction.

The outer shape of the radial protruding portion 53 is, for example, an annular plate whose axial direction is in the Z direction. The radial protruding portion 53 protrudes radially inward and outward from a distal end portion 52*a* of the protruding portion 52 in the axial direction.

The outer shape of the first seal portion 42 is, for example, a cylindrical shape in which both ends in the axial direction are bent radially outward. The first seal portion 42 is formed of an electrically insulating elastic material such as resin or rubber. The first seal portion 42 covers the inner peripheral surface 51B of the inner peripheral portion 51*b* and both surfaces 51*b*A and 51*b*B in the thickness direction of the plate-shaped body 51. The first seal portion 42 is sandwiched from both sides in the axial direction by the seat surface 31A of the screw 11 and the second washer 13 in a state where the fastening structure 10 is in a fastening state.

The outer shape of the second seal portion 43 is, for example, an annular shape in which a concave groove is formed along the circumferential direction. The second seal portion 43 is formed of an electrically insulating elastic material such as resin or rubber. The second seal portion 43 covers at least the distal end portion 52*a* of the protruding portion 52 and the surface of the radial protruding portion 53. The second seal portion 43 contacts the first fixing member 21 in a state where the fastening structure 10 is in a fastening state.

The second washer 13 is, for example, a chrysanthemum seat (toothed washer). The second washer 13 includes, for example, an annular plate-shaped portion 13*a* and a plurality of external teeth (an example of a tooth portion in the claims) 13*b*.

The inner diameter of the annular plate-shaped portion 13*a* is larger than the outer diameter of the shaft portion 32 and smaller than the inner diameter of the first seal portion 42 of the first washer 12. The annular plate-shaped portion 13*a* contacts the first seal portion 42 of the first washer 12 and the first fixing member 21 in a state where the fastening structure 10 is in a fastening state.

The plurality of external teeth 13*b* are arranged on the outer peripheral portion of the annular plate-shaped portion 13*a* at predetermined intervals along the circumferential direction. The outer diameter of the plurality of external teeth 13*b* is larger than the outer diameter of the first seal portion 42 of the first washer 12 and smaller than the inner diameter of the second seal portion 43 of the first washer 12.

The plurality of external teeth 13*b* protrude radially outward from the outer peripheral portion of the annular plate-shaped portion 13*a*, for example, while being alternately bent in different axial directions along the circumferential direction. Among the plurality of external teeth 13*b*, an external teeth 13*b* that are bent toward the first washer 12 side in the axial direction come into contact with the plate-shaped body 51 of the first washer 12 in a state where the fastening structure 10 is in a fastening state. Among the plurality of external teeth 13*b*, an external teeth 13*b* that are bent toward the first fixing member 21 side in the axial direction penetrate the coating 21*b* of the first fixing member 21 and come into contact with the main body 21*a* in a state where the fastening structure 10 is in a fastening state.

As shown in FIGS. 1 and 3, for example, the main body 22*a* of the second fixing member 22 is grounded. Since the first fixing member 21 and the second fixing member 22 are electrically insulated in the non-fastened state of the fastening structure 10, the potential of the main body 21*a* of the first fixed member 21 is indefinite.

In the fastening state of the fastening structure 10, the screw portion 32*a* of the screw 11 and the female screw 22*c* of the second fixing member 22 are brought into a conductive state by being fitted together. The screw 11 and the main body 22*a* of the second fixing member 22 have the same potential. The flange portion 31*a* of the screw 11 and the plate-shaped body 51 of the first washer 12 are brought into a conductive state by being in contact with each other. The screw 11 and the main body 41 of the first washer 12 have the same potential.

The plurality of external teeth 13*b* of the second washer 13 and the plate-shaped body 51 of the first washer 12 and the main body 21*a* of the first fixing member 21 are brought into a conductive state by being in contact with each other. The main body 41 of the first washer 12, the second washer 13, and the main body 21*a* of the first fixing member 21 have the same potential. The main bodies 21*a* and 22*a* of the first fixing member 21 and the second fixing member 22 are in a conductive state and the same potential through the screw 11, the main body 41 of the first washer 12, and the second washer 13.

In the fastening state of the fastening structure 10, the first seal portion 42 of the first washer 12 is sandwiched between the seat surface 31A of the screw 11 and the second washer 13 from both sides in the axial direction. The space between the seat surface 31A of the screw 11 and the second washer 13 is sealed by the first seal portion 42. The second seal portion 43 of the first washer 12 contacts the first fixing member 21 radially outward from the second washer 13. The space between the main body 41 of the first washer 12 and the first fixing member 21 is sealed by the second seal portion 43.

According to the embodiment described above, by providing the first washer 12 having the bottomed cylindrical shape, it is possible to arrange the second washer 13 for conduction between the plate-shaped body 51 and the first seal portion 42 of the first washer 12 and the first fixing member 21. The first washer 12 can make the flange portion 31a of the screw 11 and the main body 21a of the first fixing member 21 brought into a conductive state and have the same potential via the second washer 13. The shaft portion 32 of the screw 11 is fitted to the female screw 22c of the second fixing member 22. Thereby, the main body 21a of the first fixing member 21 and the main body 22a of the second fixing member 22 can be brought into a conductive state and have the same potential.

The first washer 12 can secure desired sealing properties between the flange portion 31a of the screw 11 and the second washer 13 and the first fixing member 21 by the first seal portion 42 and the second seal portion 43.

The first washer 12 has a radial protruding portion 53 that protrudes radially from a distal end portion 52a of the protruding portion 52 in the axial direction. Therefore, for example, the contact area between the second seal portion 43 and the first fixing member 21 can be increased as compared with the case where the radial protruding portion 53 is not provided. The radial protruding portion 53 can improve the sealing performance between the second seal 43 and the first fixing member 21.

The second washer 13 is provided to have the external teeth 13b penetrating the coating 21b of the first fixing member 21 and contacting the conductive body 21a and the external teeth 13b contacting the conductive plate-shaped body 51 of the first washer 12. Thereby, the conductive state between the screw 11 and the first fixing member 21 can be easily and accurately secured.

Hereinafter, modified examples will be described.

In the embodiment described above, the head 31 of the screw 11 is provided with the flange portion 31a, but it is not limited thereto and the flange portion 31a may be omitted. In this case, the outer diameter of the seat surface of the head 31 is set to be larger than the inner diameter of the plate-shaped body 51 of the first washer 12.

In the above-described embodiment, the screw 11 is fastened and fixed to the second fixing member 22 by fitting the screw portion 32a to the female screw 22c of the second fixing member 22, but it is not limited thereto. The screw 11 may be fixed to the second fixing member 22 by, for example, fitting the screw portion 32a to a conductive nut or the like that is in electrical contact with the main body 22a of the second fixing member 22.

In the embodiment described above, the main body 41 of the first washer 12 is provided with the radial protruding portion 53, but the present invention is not limited thereto and the radial protruding portion 53 may be omitted.

According to at least one embodiment described above, by having the bottomed cylindrical first washer 12, it is possible to arrange the second washer 13 for conduction between the plate-shaped body 51 and the first seal portion 42 of the first washer 12 and the first fixing member 21. The first washer 12 can make the flange portion 31a of the screw 11 and the main body 21a of the first fixing member 21 brought into a conductive state and have the same potential via the second washer 13.

Although several embodiments of the present invention have been described, these embodiments are provided by way of example and are not intended to limit the scope of the invention. These embodiments can be implemented in other various forms, and various omissions, replacements, and changes can be made without departing from the spirit of the invention. These embodiments and their modifications are included in the scope and gist of the invention, and are also included in the invention described in the claims and equivalents thereof.

REFERENCE SIGNS LIST

10: Fastening structure, 11: Screw, 12: First washer (Washer), 13: Second washer (Annular member), 13b: External teeth (Tooth portion), 21: First fixing member, 21b, 22b: Coating (Coating layer), 22: Second fixing member, 31: Head, 31a: Flange portion, 31A: Seat surface, 32: Shaft portion, 32a: Screw portion, 41: Body, 42: First seal portion, 43: Second seal portion, 51: Plate-shaped body, 51a: Outer peripheral portion, 51b: Inner peripheral portion, 51B: Inner peripheral surface, 51bA, 51bB: Both surfaces, 52: Protruding portion, 52a: Distal end portion, 53: Radial protruding portion

The invention claimed is:

1. A fastening structure comprising:
a washer including a conductive body including an annular plate-shaped body and a protruding portion protruding in a thickness direction from an outer peripheral portion of the plate-shaped body, a first seal portion configured to cover an inner peripheral surface of an inner peripheral portion and both surfaces in the thickness direction of the plate-shaped body, and a second seal portion configured to cover at least a distal end portion of the protruding portion;
a conductive annular member that contacts the main body and the first seal portion on the same side as the protruding portion in the thickness direction of the washer, and that contacts a first fixing member together with the second seal portion; and
a conductive screw configured to fix the first fixing member and a second fixing member disposed on a side opposite to the second seal portion and the annular member in a thickness direction of the first fixing member,
wherein the screw includes
a head contacting the main body and the first seal portion on a side opposite to the protruding portion in the thickness direction of the washer; and
a shaft portion configured to be inserted into through holes of the washer, the annular member and the first fixing member, and to be fixed to the second fixing member in an electrically connected state.

2. The fastening structure to claim 1, wherein the washer further includes a radial protruding portion that protrudes radially from the distal end portion and is covered by the second seal portion.

3. The fastening structure according to claim 1, wherein the annular member includes a tooth portion configured to penetrate an electrically insulating coating layer that covers a surface of the conductive body of the first fixing member and to contact the conductive body.

4. The fastening structure according to claim 2, wherein the annular member includes a tooth portion configured to penetrate an electrically insulating coating layer that covers a surface of the conductive body of the first fixing member and to contact the conductive body.

* * * * *